Figure 1:
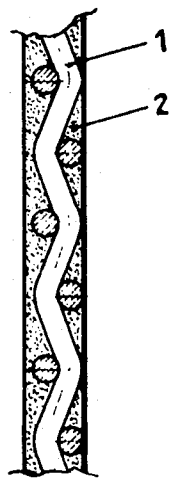

United States Patent

[11] 3,615,847

| [72] | Inventor | Claude Vanleugenhaghe<br>Avenue Lancewseert n°20, Brussels 15,<br>Belgium |
|---|---|---|
| [21] | Appl. No. | 796,504 |
| [22] | Filed | Feb. 4, 1969 |
| [45] | Patented | Oct. 26, 1971 |
| [32] | Priority | Feb. 5, 1968 |
| [33] | | Great Britain |
| [31] | | 5623/68 |

[54] MANUFACTURE OF ELECTRODES FOR FUEL CELLS
7 Claims, 2 Drawing Figs.

[52] U.S. Cl. .................................................. 136/86 E,
136/120 FC
[51] Int. Cl. ................................................ H01m 27/04,
H01m 13/04
[50] Field of Search ............................................. 156/2;
117/47 R; 136/120 FC, 121, 86, 86 E

[56] References Cited
UNITED STATES PATENTS

| 2,789,063 | 4/1957 | Purvis et al. ................. | 117/47 R |
| 3,390,067 | 6/1968 | Miller et al. .................. | 117/47 R |
| 3,457,113 | 7/1969 | Deibert ........................ | 136/121 |

FOREIGN PATENTS

| 938,920 | 10/1963 | Great Britain ............... | 136/120 |

Primary Examiner—Winston A. Douglas
Assistant Examiner—M. J. Andrews
Attorney—Young & Thompson

ABSTRACT: The electrochemical performance of a fuel cell electrode consisting of a laminated or compressed mixture of carbon, a catalyst and a fluorocarbon polymer as binder is improved by contacting the electrode with a metal reacting with the fluorocarbon polymer and selected from the class of the alkali metals and the alkaline earth metals at a temperature sufficient to cause reaction between the metal and the polymer, the reaction being confined to the surface without degrading the bulk of the polymer.

PATENTED OCT 26 1971 3,615,847

INVENTOR
CLAUDE VANLEUGENHAGHE
By Young & Thompson
ATTYS.

MANUFACTURE OF ELECTRODES FOR FUEL CELLS

FIELD OF THE INVENTION

This invention relates to improvements to the manufacture of electrodes for fuel cells, particularly for fuel cells with liquid electrolytes, such as potassium hydroxide solutions.

BACKGROUND OF THE INVENTION

It is known that a fuel cell electrode generally consists of a porous electrically conductive material which may itself be catalytically active or act as a support for a catalyst. In fuel cells using gaseous fuels and oxidants on one side of the electrodes and a liquid electrolyte between the electrodes, the flooding of the entire pore volume of the electrodes and of the gas chambers must be avoided by suitable means.

It is known that the choice of an adequate porosity of the electrodes and the maintenance of a suitable gas pressure in the gas chambers allow to prevent a complete flooding of the pore volume of the electrodes and of the gas chambers. Electrodes consisting of superimposed layers of different porosities or electrodes with continuously changing porosity from one side to the other have been developed. Another means of preventing the flooding of the electrodes and of the gas chambers consists in rendering the surface of the electrodes, in contact with the electrolyte, hydrophobic towards the electrolyte. Various processes for obtaining this result have been described in literature. One of the generally used methods for rendering electrodes hydrophobic consists in the admixture of a product which is not wetted by the electrolyte, to the electrically conductive material. The products generally used for this purpose are polytetrafluorethylene polyhexafluoropropylene and similar fully halogenated polyolefins.

The electrochemical reaction can take place only at sites on the surface and within the pores of the electrodes, which are in direct contact with the electrolyte. Catalyst particules which are located at sites which the electrolyte cannot reach cannot exercise their catalytic action. Since a fuel cell electrode is not a two-dimensional structure with all active sites on the surface, but consists of a three-dimensional structure with active sites located within the pores below the surface, it is necessary to make sure that the electrolyte may also penetrate into the three-dimensional porous structure of the electrode. This penetration of the electrolyte into the interior pore structure is not possible when the electrodes are made fully hydrophobic by the admixture of the above mentioned halogenated polymers.

It is known that solid fluorinated hydrocarbons which are hydrophobic can be subjected to a heat-treatment so that partial decomposition takes place and the resulting product becomes hydrophilic or wettable. This method has been used by others in order to produce a hydrophilic layer on electrodes which originally were hydrophobic. In order to preserve a hydrophobic layer below the hydrophilic layer, two varieties of fluorinated hydrocarbons are used the one of which decomposes at a lower temperature than the other. If the product with the lower decomposition temperature is used as binder for the top layer, the latter will decompose upon heating to a suitable temperature while the bottom layer containing the binder with a higher decomposition temperature will remain unchanged. Thus, the top layer becomes hydrophilic and the bottom layer remains hydrophobic.

This known method has however severe disadvantages: the decomposition of the thermally unstable binder occurs throughout its entire mass. Thus it becomes a hard, friable and crumbling product. Its mechanical resistance is considerably reduced. The top layer easily breaks and falls off when the electrode is bent, vibrated or otherwise subjected to mechanical stress.

It is also known that a nonwettable electrode can be made wettable either by adding a suitable wetting agent to the binder prior to the pressing of the layer to be made wettable, or by applying the wetting agent on the surface of the electrode. This method also has disadvantages because the wetting agent does not react with the surface of the inert hydrophobic binder and therefore does not stay in place permanently. It is washed out by the electrolyte and eventually the electrode will again become hydrophobic and therefore less active.

It therefore seemed necessary to search for a suitable method which would permit to impart hydrophilic properties to the top layer of an electrode containing a fluorinated hydrocarbon polymer as binder, without deteriorating the mechanical properties of the latter.

It is known that the normally passive surface of fluorinated hydrocarbon polymers can be rendered active towards organic adhesive coatings by treating the surface with an alkali metal, such as lithium, sodium, potassium, rubidium and cesium, or with an alkaline earth metal, such as calcium or magnesium.

To carry out the treatment, the metal must be in a fluid form, either vaporized, molten, dissolved, finely suspended or powdered. The alkali or alkaline earth metals dissolved in liquid ammonia react already at low temperatures. Alkali at room temperature. The metal vapors, the molten alloys, the powdered hydrides or borohydrides and the other metals react only at elevated temperatures.

It therefore seemed interesting to examine the effects which a similar treatment might have on the performance of an electrode containing a fluorinated hydrocarbon polymer as binder. It was assumed that the following reactions may take place at the surface of the fluorinated hydrocarbon polymer:

A. Treatment by a metal, f.i. sodium dissolved in anhydrous liquid ammonia

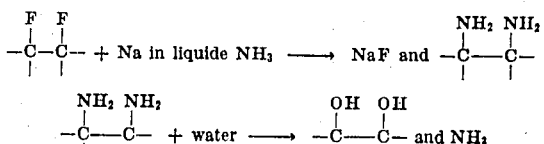

B. Treatment by alkali metal vapors, melts, molten alloys, hydrides or borohydrides, f.i. of sodium

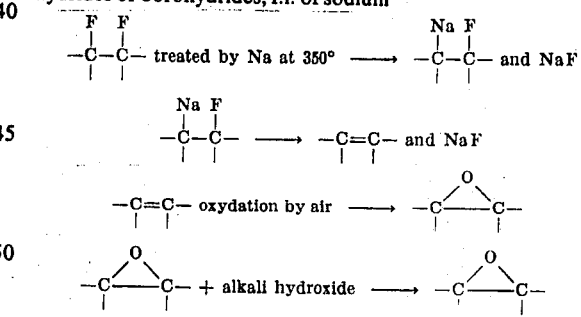

These examples of possible reactions show that the treatment of the surface of fluorinated hydrocarbon polymers with various strongly electropositive metal atoms or ions causes dehalogenation of peripheric carbon atoms. After removal of the excess of the reagent and washing with water or alkali hydroxide, hydroxyl groups will most probably occupy the places from which the fluorine has been removed.

Care must be taken to carry out the surface treatments as gentle as possible in order to avoid outright carbonization of the surface of the fluorocarbon polymer because the mechanical properties of the product would suffer.

Figure 2:
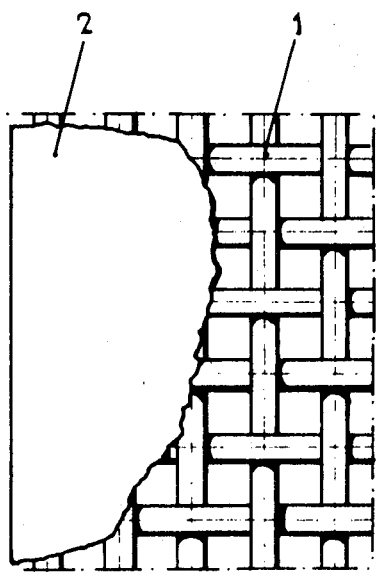

In order to check the considerations outlined above the method was tried out on standard fuel cell electrodes consisting of a nickel grid and a mixture of activated charcoal, a catalyst and polytetrafluroethylene which was bonded to the nickel grid by lamination. In the accompanying drawing, FIG. 1 is a greatly enlarged cross-sectional view of a fragment of a fuel cell electrode according to the present invention; and FIG. 2 is a plan view of the fragment shown in FIG. 1, with a portion of the supported layer broken away. Several embodiments of the invention are presented in the following nine examples:

EXAMPLE 1

A fuel cell electrode having a surface of 4 cm.$^2$ consisting of a nickel grid 1 having an opening size of 52 mesh and a wire diameter of 200 microns, supporting a layer 2 consisting of 6.25 percent by weight of polytetrafluoroethylene and 94.75 percent by weight of a mixture of 80 percent by weight of active charcoal with 10 percent by weight of palladium metal and 10 percent by weight of platinum metal as catalyst, the total thickness of the electrode being of 359 microns and its catalyst loading about 2 mg. each of palladium metal and platinum metal per cm.$^2$, was dipped for 75 seconds in a solution of 400 mg. of sodium in 300 ml. of anhydrous liquid ammonia, covered by an atmosphere of an inert gas, such as nitrogen. The treated electrode was then removed from the solution, washed with distilled water and airdried.

EXAMPLE 2

Same procedure as in Example 1, the dipping solution consisting of 125 mg. lithium in 300 ml. of anhydrous liquid ammonia.

EXAMPLE 3

Same procedure as in Example 1, the dipping solution consisting of 710 mg. potassium in 300 ml. of anhydrous liquid ammonia.

EXAMPLE 4

Same procedure as in Example 1, the dipping solution consisting of 365 mg. calcium in 300 ml. of anhydrous liquid ammonia, the dipping time being 3 minutes.

EXAMPLE 5

An untreated fuel cell electrode as described in Example 1, was covered with potassiumborohydride K(BH$_4$) powder (about 1 mg./cm.$^2$) on the side normally in contact with the electrolyte. The electrode was placed horizontally in a controlled atmosphere furnace in which a stream of dried argon was maintained. After preheating for 30 minutes at 150° C. the temperature was raised to 350° C. and kept at this level during 90 minutes. After cooling the electrode was removed from the furnace and rinsed in 6N potassium hydroxide.

EXAMPLE 6

An untreated fuel cell electrode as described in Example 1, was treated as described in Example 5 with the difference that sodium hydride (NaH) powder was used instead of K(BH$_4$).

EXAMPLE 7

An untreated fuel cell electrode as described in Example 1 was placed horizontally in a flat dish so that the active surface was above. The commercial treating agent "Chemgrip" $x$), $x$ "Chemgrip" treating agent is an especially formulated, high-flash-point etching solution for treating TFE ("Teflon/Halon") and other fluorocarbon polymers to render their surfaces receptive to industrial adhesives. The solution is an activated form of sodium which, when brought into contact with a fluorocarbon polymer, extracts fluorine atoms from the surface of the TFE, exposing a carbonaceous layer to which adhesives will adhere. manufactured by CHEMPLAST INC. 150 Dey Road, Wayne, N.J., was poured over the exposed surface of the electrode so that the latter became evenly covered. The treating agent was left there for about a minute. The electrode was then removed from the dish, rinsed first in N-butylalcohol and then with hot water. It was finally airdried.

EXAMPLE 8

Same procedure as in Example 1, the dipping solution consisting of 400 mg. of sodium in 300 ml. of anhydrous liquid methylamine.

EXAMPLE 9

Same procedure as in Example 7, the treating agent consisting of a solution of 133 mg. sodium and 680 mg. naphtalene in 100 ml. of dry tetrahydrofuran.

The electrodes treated as described in Examples 1 to 9 as well as an untreated electrode, were mounted in half-cell assemblies and tested once as oxygen electrode and once as hydrogen electrode, using a mercury-mercury oxide reference electrode.

The operating conditions were:
Temperature : 70° C.
Electrolyte 10:10 5N KOH Gas pressures : the hydrogen and oxygen pressures were
adjusted in each experiment so as to obtain minimum polarization. They varied for H$_2$ between 200 and 400 g./cm.$^2$ and for oxygen between 100 and 600 g./cm.$^2$.

TABLE I.—POLARIZATION VOLTAGES OF ELECTRODES TREATED ACCORDING TO THE EXAMPLES 1 TO 9 AND OF AN UNTREATED ELECTRODE OF THE SAME COMPOSITION AND STRUCTURE

| | Polarization voltages in millivolts | | | | | | | | | | | | | | | | | | |
|---|---|---|---|---|---|---|---|---|---|---|---|---|---|---|---|---|---|---|---|
| | Treated electrodes | | | | | | | | | | | | | | | | | | Untreated electrode |
| Current densities, in mA./cm.$^2$ | Ex. 1 | | Ex. 2 | | Ex. 3 | | Ex. 4 | | Ex. 5 | | Ex. 6 | | Ex. 7 | | Ex. 8 | | Ex. 9 | | |
| | H$_2$ | O$_2$ | H$_2$ | O$_2$ | H$_2$ | O$_2$ | H$_2$ | O$_2$ | H$_2$ | O$_2$ | H$_2$ | O$_2$ | H$_2$ | O$_2$ | H$_2$ | O$_2$ | H$_2$ | O$_2$ | H$_2$ O$_2$ |
| 50 | 2 | 58 | 3 | 63 | 2 | 60 | 4 | 66 | 5 | 70 | 2 | 52 | 7 | 75 | 3 | 62 | 6 | 70 | 25 65 |
| 100 | 6 | 69 | 8 | 76 | 5 | 72 | 9 | 79 | 7 | 93 | 4 | 83 | 14 | 121 | 7 | 74 | 12 | 89 | 29 90 |
| 300 | 17 | 103 | 19 | 111 | 15 | 106 | 20 | 117 | (1) | 129 | 12 | 120 | 37 | 173 | 18 | 108 | 28 | 161 | 78 191 |
| 500 | 23 | 132 | 25 | 139 | 21 | 135 | 26 | 143 | (2) | 150 | 20 | 148 | 83 | 211 | 24 | 137 | 36 | 193 | 124 285 |

NOTE.—The figures between ( ) are uncertain.

The test results summarized in Table 1 show the surprising fact that treatments which are known to render the surface of fluorocarbon polymers receptive to organic adhesives improve considerably the electrochemical performance of fuel cell electrodes containing fluorocarbon polymers as binder.

A fuel cell was built with two electrodes treated according to the procedure described in Example 1. The electrolyte was 5N KOH and the operating temperature 70° C. Pure hydrogen was admitted to one electrode and pure oxygen to the other. The hydrogen pressure was 100 g./cm.$^2$ and the oxygen pressure was 200 g./cm.$^2$.

The working voltages of this fuel cell at different current densities are shown in Table II which also reproduces comparable data published by R.G. HALDEMAN, Proceedings of the 21st Annual Power Sources Conferences, 16th 17th and 18th May 1967, Session on Fuel Cell Electrodes, page 1, for a high-performance fuel cell electrode.

TABLE II

| | Working voltages in mV. | |
|---|---|---|
| Current densities in mA./cm.$^2$ | Electrode treated according to Ex. 1. Electrolyte: 5N KOH. Temperature: 70° C. | Haldeman high-performance electrode. Electrolyte: 50% KOH. Temperature: 100° C. |
| 0 | 1,000 | 1,100 |
| 50 | 940 | 980 |
| 100 | 920 | 940 |
| 200 | 884 | 876 |
| 300 | 854 | 826 |
| 400 | 820 | |
| 500 | 770 | |

Particular attention must be drawn to the fact that the tested electrode treated according to this invention contained only 2 mg. of platinum and 2 mg. of palladium per cm.$^2$, whereas the Haldeman high-performance electrode contained 40 mg. of platinum per cm.$^2$, according to the cited publication.

The comparison of the figures of Table II shows that the working voltages of the fuel cell with electrodes treated according to this invention are slightly lower at low current densities and slightly higher at high current densities than the corresponding working voltages of the Haldeman fuel cell.

Taking into account the difference in operating temperature (70° C. versus 100° C.) it It is obvious that at the same operating temperature the performance of the electrodes treated according to this invention would be higher than that of the Haldeman electrode throughout the entire range of current densities. This illustrates clearly the outstanding value of the present invention which represents a major breakthrough in fuel cell technology.

I claim:

1. A method for improving the electrochemical performance of a fuel cell electrode consisting of a laminated or compressed mixture of carbon, a catalyst and a fluorocarbon polymer as binder, which comprises contacting the electrode with a metal selected from the class consisting of the alkali metals and the alkaline earth metals at a temperature sufficient to cause an attack of the polymer binder by said metal, the attack being confined to the surface of the electrode without degrading the bulk of the polymer binder.

2. A method according to claim 1, in which the metal is applied to said electrode in the form of a solution in a solvent selected from the class consisting of anhydrous liquid ammonia and anhydrous organic solvents.

3. A method according to claim 2 in which the metal is lithium, sodium, potassium or calcium dissolved in anhydrous liquid ammonia.

4. A method according to claim 2 in which said metal is an alkali metal dissolved in a mixture of naphthalene and tetrahydrofuran.

5. A method according to claim 2 in which said metal is an alkali metal dissolved in anhydrous liquid methylamine.

6. A method according to claim 1 in which the metal is applied to said electrode in the form of a metal hydride or borohydride.

7. A method according to claim 6 in which said metal is in the form of sodium hydride or potassium borohydride.

* * * * *